United States Patent [19]

Sikkema et al.

[11] Patent Number: 5,115,058
[45] Date of Patent: May 19, 1992

[54] BIO- AND PHOTO-DEGRADABLE RESIN COMPOSITION

[75] Inventors: Kevin D. Sikkema; Duane B. Priddy, both of Midland, Mich.

[73] Assignee: The Dow Chemical Company, Midland, Mich.

[21] Appl. No.: 755,914

[22] Filed: Sep. 6, 1991

Related U.S. Application Data

[63] Continuation-in-part of Ser. No. 631,509, Dec. 21, 1990, abandoned.

[51] Int. Cl.⁵ .................. C08F 226/06; C08F 224/00
[52] U.S. Cl. .................................... 526/258; 526/260; 526/266; 526/270; 526/316; 526/914
[58] Field of Search ............... 526/258, 260, 266, 270

[56] References Cited

U.S. PATENT DOCUMENTS

| | | | |
|---|---|---|---|
| 3,753,952 | 8/1973 | Guillet | 526/312 |
| 3,853,814 | 12/1974 | Guillet | 526/328 X |
| 3,860,538 | 1/1975 | Guillet et al. | 521/139 |
| 4,176,145 | 11/1979 | Guillet | 525/72 |
| 4,549,010 | 10/1985 | Sparer | 528/361 |
| 4,923,941 | 5/1990 | Bailey | 526/268 |
| 4,957,986 | 9/1990 | Cripps | 526/247 |

OTHER PUBLICATIONS

W. J. Bailey et al. (1982) Macromol 15, 711-714.
W. J. Bailey et al. (1986) Makromal Chem., Macromal Symp., 6, 81-100.

Primary Examiner—Edward J. Smith
Assistant Examiner—M. Nagumo

[57] ABSTRACT

Photodegradable and biodegradable polymers comprising both ketone functionality and hydrolyzable polymer ester or amide functionality and thermoplastic articles formed therefrom are disclosed.

5 Claims, No Drawings

BIO- AND PHOTO-DEGRADABLE RESIN COMPOSITION

CROSS-REFERENCE TO RELATED APPLICATION

This is a continuation-in-part of Ser. No. 631,509, filed Dec. 21, 1990, now abandoned.

BACKGROUND OF THE INVENTION

This invention relates to novel plastic compositions having enhanced environmental degradability. More particularly the present invention relates to thermoplastic resins having both photodegradable and biodegradable properties.

The advent of thermoplastics has given rise to improved articles and packaging. For example, molded, foamed, and thermoformed articles, such as solid objects, films, bottles, bags, cartons, and other containers have the advantages of being chemically resistant, relatively unbreakable, and light in weight. However, the increasing use of thermoplastics in packaging and other applications has created a serious waste disposal problem. Many plastic objects litter the countryside after being discarded by careless users.

One approach to the alleviation of the problem of plastic waste and litter is the development of novel polymeric compositions which undergo accelerated degradation under environmental conditions. This general approach has been described in the prior art.

Photosensitizing ketone groups have been introduced into the structure of polymer molecules by the copolymerization of ethylenically unsaturated monomers with vinyl ketones. For example, reference is made to U.S. Pat. Nos. 3,753,952, 3,860,538 and 4,176,145 which describe the preparation of photodegradable polymeric materials by the copolymerization of vinyl- or isopropenyl ketones with copolymerizable comonomers.

Polymers having ketone groups at positions adjacent to the chain, such as those derived from vinyl ketone comonomers, can undergo photochemical degradation by direct photolytic chain scission. This mechanism leads to a rapid decrease in molecular weight upon exposure to ultraviolet radiation. As a result, articles formed from the polymer become friable and soon are crushed to small particulates which are incorporated with the soil.

W.J. Bailey disclosed improved biodegradable resins containing hydrolyzable ester or other polar functionality by ring opening copolymerization of 2-methylene-1,3-dioxepane and similar cyclic compounds in *Makromol. Chem., Macromol. Symp.* 6, 81–100 (1986).

Although either degradation process employed alone as taught by the prior art may be utilized to decompose thermoplastic articles, often the selected method for decomposition is impractical. For example, plastic articles that decompose upon exposure to light may be disposed of by burial in a land fill thereby circumventing any advantage due to UV degradation properties. Similarly, biodegradable polymeric items that litter the landscape are not readily decomposed because the microorganisms of the soil are not able to contact the polymer.

It would be desirable to provide a thermoplastic resin suitable for use in the manufacture of containers, packaging, films and foams that is susceptible to both ultraviolet light degradation and microbial degradation. The presence of two mechanisms for polymer destruction gives improved degradation performance. Objects which are at first exposed only to the action of light are quickly reduced to small particulates that provide intimate contact with soil, thereby promoting more rapid bioreduction. Thus the two mechanisms cooperate in a synergistic manner to provide improved degradable resins.

According to the present invention there are provided polymeric compositions comprising repeating units corresponding to the formulas:

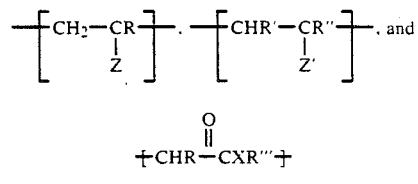

wherein R is hydrogen or methyl; R' is hydrogen, $C_{1-6}$ alkyl, $C_{1-6}$ alkoxide, or phenyl; R" is R, CN, CONR*$_2$, or $CO_2R^*$, wherein R* is H, $C_{1-10}$ alkyl, $C_{6-10}$ aryl, or $C_{6-10}$ alkaryl; R''' is $C_{2-4}$ α,ω-alkadiyl, optionally substituted with up to 2 $C_{1-6}$ alkyl or phenyl groups; X is oxygen or nitrogen; Z is a phenyl or $C_{1-4}$ alkyl or halo substituted phenyl, halo, CN, or $CO_2R^*$; and Z' is a $C_{2-10}$ aliphatic or aromatic acyl moiety derived from a vinyl ketone, isopropenyl ketone or substituted derivative thereof. The present invention combines in one polymer photodegradability due to pendant ketone functionality and hydrolytic susceptability due to the presence of amide or ester functionality in the polymer backbone.

The polymers are suitably prepared by copolymerizing 1) one or more vinyl monomers selected from the group consisting of styrene, vinyl chloride, acrylonitrile, acrylic acid, methacrylic acid and $C_{1-6}$ alkyl esters of acrylic acid or methacrylic acid; 2) one or more unsaturated ketone functional monomers corresponding to the formula: CHR'=CR"Z'; and 3) one or more monomers selected from the group consisting of: 1,3-oxazilidenes or 1,3-dioxolanes having ethylenic unsaturation at the 2 position, and cyclic acrylate monomers corresponding to Formula I:

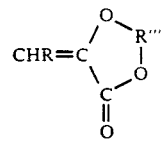

wherein R and R''' are as previously described. The monomers of group 3) are referred to hereafter as ester or amide yielding monomers.

The terpolymers may be prepared by polymerization of the respective monomers under free radical, solution or bulk polymerization conditions. Preferably the respective monomers are combined in the presence of a free radical initiator at temperatures from 25° to 200° C., more preferably 50° to 150° C. Suitable free radical initiators include peroxide or azo containing compounds. A solvent such as toluene, tetrahydrofuran, or similar non-reactive liquid may also be present.

Preferably the quantity of monomers is adjusted so as to provide from 0.1 to 10.0 mole percent, more preferably 0.2 to 5.0 mole percent of the various ketone functional monomer and ester or amide yielding monomer components in the polymer.

A preferred vinyl monomer is styrene, i.e. Z preferably is phenyl. Preferred ketone functional monomers are methyl-, ethyl-, propyl-, butyl-, phenyl-, and benzyl- vinyl ketones and methyl-, ethyl-, propyl-, butyl-, phenyl-, and benzyl- isopropenyl ketones, and 4-phenyl-3-butene-2-one. A most preferred ketone functional monomer is methyl vinyl ketone, ie. Z' is acetyl. Preferred ester of amide yielding monomers are 2-methylene-1,3-oxazilidene, 2-methylene-1,3-dioxolane, 2-methylene-1,3-dioxepane, 2-phenylmethylene-1,3-dioxepane, 2-methylene-4-phenyl-1,3-dioxolane, 2-methylene-4-phenyl-1,3-oxazilidene, 2,2-dimethyl-4-keto-5-methylene-1,3-dioxolane and 2-phenyl-4-keto-5-methylene-1,3-dioxolane. A most preferred such monomer is 2-methylene-1,3-dioxepane, i.e. R''' is 1,4-butanediyl and X is oxygen.

The polymers preferably have a molecular weight (Mw) from 50,000 to 2,000,000, more preferably from 100,000 to 1,000,000. Molecular weights are determined according to gel permeation chromatography using a polystyrene standard.

The polymers are readily thermoformed, molded or extruded into films according to known fabrication techniques. Secondary operations such as foaming, orientation, printing, etc. are also easily performed utilizing previously known techniques. Advantageously the polymers according to the present invention readily decompose into particulates upon exposure to ultraviolet radiation and are easily attacked by microbial action to further decompose into carbon dioxide. Thus the polymers comprise the beneficial effects of both degradation mechanisms in order to produce easily degradable resin compositions. Having described the invention the following example is provided as further illustrative and is not to be construed as limiting.

EXAMPLE 1

A sealed, glass ampoule containing 0.36 g styrene, 0.40 g 2-methylene-1,3-dioxepane, and 0.04 g methyl vinyl ketone was heated at 140° C. for 6 hours. The resulting polymer was filtered. The conversion was 33 percent and the weight average molecular weight (polystyrene standard) was 200,650 (Mw). The polymer was precipitated twice from methylene chloride and methanol, and a film cast from methylene chloride. The IR contained peaks at 1735 cm$^{-1}$ (ester C=O) and 1715 cm$^{-1}$ (ketone C=O). Based on this analysis the polymer was identified as containing about 96 mole percent styrene; 2 mole percent —CH$_2$CHC(O)CH$_3$— and 2 mole percent —CH$_2$C(O)OC$_6$H$_{12}$— functionality.

Exposure to ultraviolet light for 7 days results in a highly friable crumbly structure. Compounding the particulated polymer with a mixed microflora from soil and culturation for 20 days results in carbon dioxide generation, indicating biohydrolysis occurs.

What is claimed is:

1. Thermoplastic polymers comprising repeat units corresponding to the formulas:

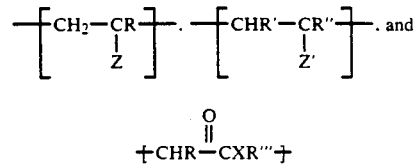

wherein R is hydrogen or methyl; R' is hydrogen, C$_{1-6}$ alkyl, C$_{1-6}$ alkoxide, or phenyl; R'' is R, CN, CONR*$_2$, or CO$_2$R*, wherein R* is H, C$_{1-10}$ alkyl, C$_{6-10}$ aryl, or C$_{6-10}$ alkaryl; R''' is C$_{2-4}$ α,ω-alkadiyl, optionally substituted with up to 2 C$_{1-6}$ alkyl or phenyl groups; X is oxygen or nitrogen; Z is a phenyl or C$_{1-4}$ alkyl or halo substituted phenyl, halo, CN, or CO$_2$R*; and Z' is a C$_{2-10}$ aliphatic or aromatic acyl moiety derived from a vinyl ketone, isopropenyl ketone or substituted derivative thereof.

2. A thermoplastic polymer according to claim 1 wherein Z is phenyl.

3. A thermoplastic polymer according to claim 1 wherein Z' is acetyl.

4. A thermoplastic polymer according to claim 1 wherein X is oxygen and R''' is 1,4-butanediyl.

5. A thermoplastic article having photodegradable and biodegradable properties comprising a polymer according to claim 1.

* * * * *